W. L. BLISS.
TAPER CHARGE REGULATOR.
APPLICATION FILED APR. 29, 1911.
1,354,798.
Patented Oct. 5, 1920.
2 SHEETS—SHEET 1.
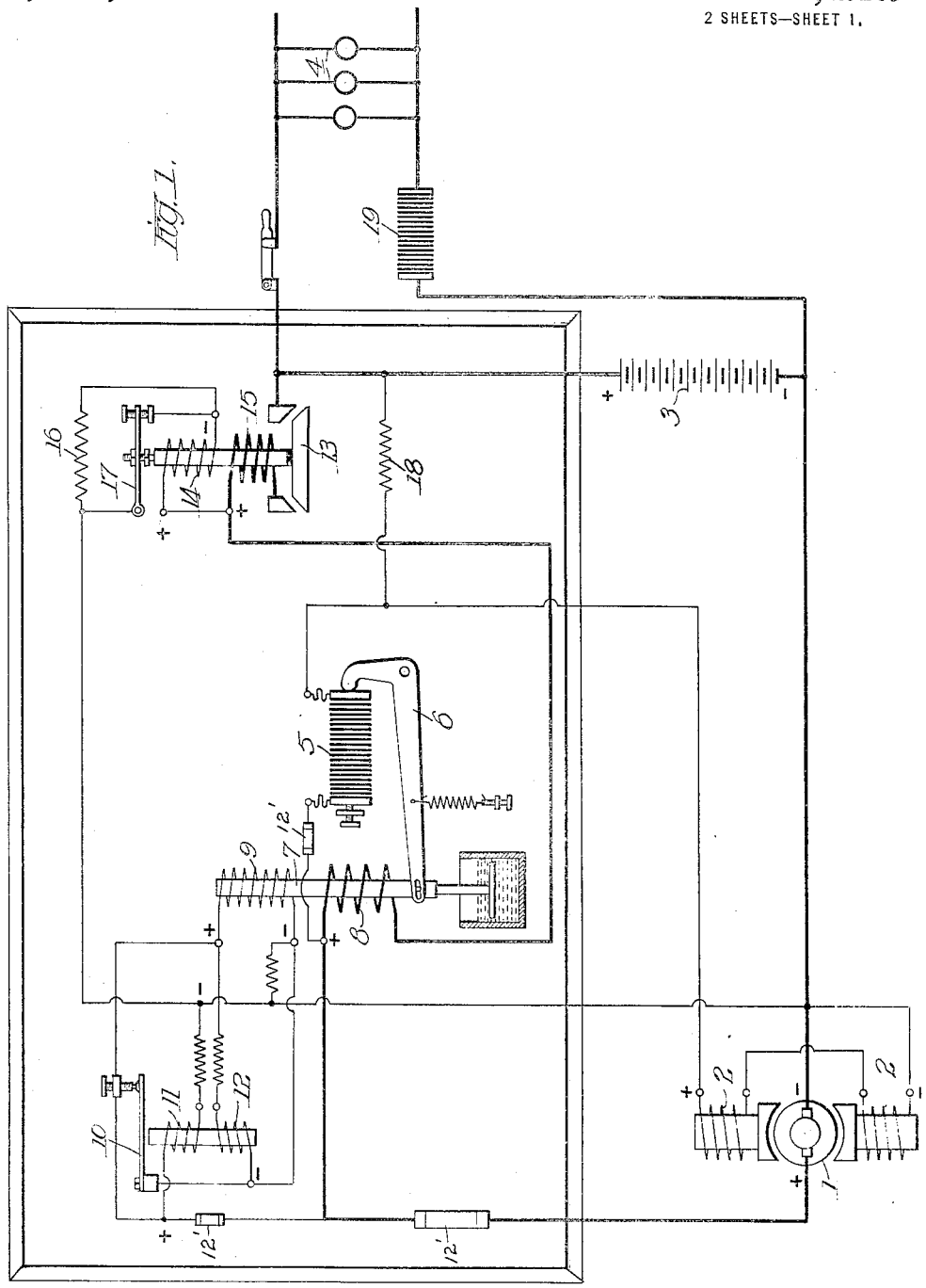

W. L. BLISS.
TAPER CHARGE REGULATOR.
APPLICATION FILED APR. 29, 1911.
1,354,798.
Patented Oct. 5, 1920.
2 SHEETS—SHEET 2.
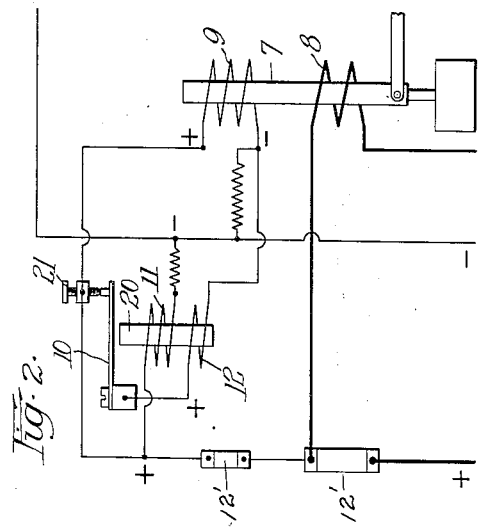
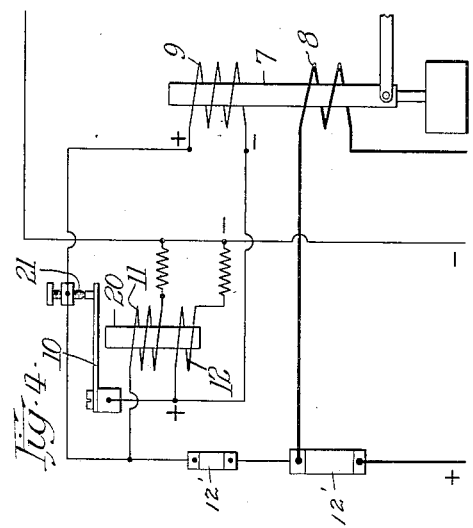
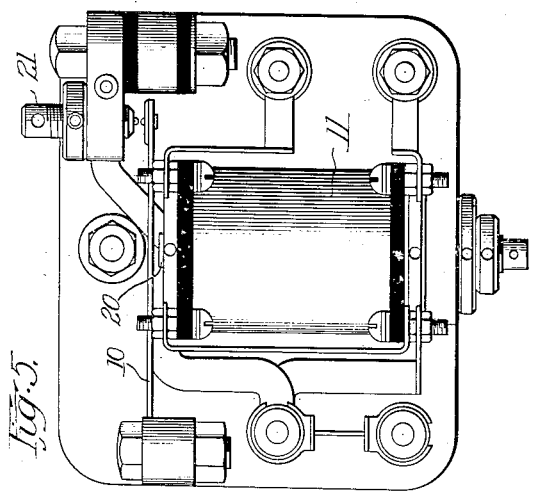
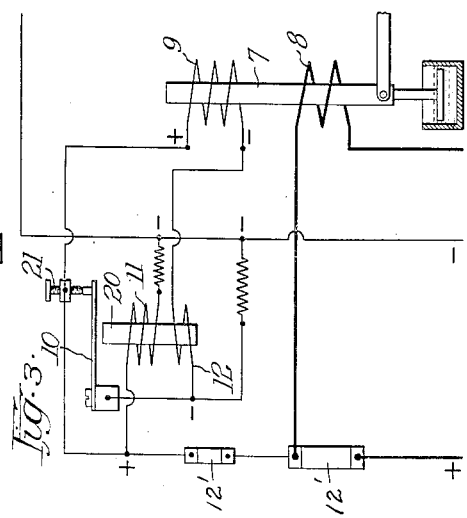

UNITED STATES PATENT OFFICE.

WILLIAM L. BLISS, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

TAPER CHARGE REGULATOR.

1,354,798.     Specification of Letters Patent.     Patented Oct. 5, 1920.

Application filed April 29, 1911. Serial No. 624,109.

*To all whom it may concern:*

Be it known that I, WILLIAM L. BLISS, a citizen of the United States, residing at Niagara Falls, in the county of Niagara and State of New York, have invented new and useful Improvements in Taper Charge Regulators, of which the following is a full, clear, concise, and exact description, reference being had to the accompanying drawing, forming a part of this specification.

My invention relates to a taper charge regulator and to a system employing such a regulator. The regulator is adapted for use in systems wherein a generator and storage battery are employed.

One of the objects of my invention is to provide a system wherein the generator is regulated to maintain constant current during the charging of the battery, and wherein the battery charging current is reduced or tapered off after the battery has become fully charged. Another object is to provide a regulator for furnishing such regulation. A further object of the invention is to provide an organized structure including a plurality of devices which co-operate with each other in the regulation of a system such as outlined, and which are preferably mounted on a common panel or base.

The accompanying drawings show a car lighting system including a regulator, which will serve to illustrate the application of my invention. Of course the invention may be embodied in other systems and apparatus.

Referring to the drawings—

Figure 1 illustrates a car lighting system;

Figs. 2, 3 and 4 illustrate modified connections for a portion of the regulator;

Fig. 5 illustrates the taper charge relay in elevation.

In the system illustrated, a variable speed generator is shown having an armature 1 and shunt field coils 2. The external circuit includes the storage battery 3, and the lamp circuit 4 connected in parallel branches. The variable pressure rheostat 5 is connected in the generator shunt field circuit to vary the resistance of the same. This rheostat consists of a series of contacting carbon plates, or other plates, adapted to have the pressure thereof varied by a bell crank lever 6, which is operated by a plunger 7 controlled normally by a current responsive coil 8 connected in the external circuit of the generator and also controlled, under certain conditions, by a voltage responsive coil 9 connected in a shunt circuit across the generator terminals. A dash pot is provided to steady the action of the plunger and associated parts. When the generator armature is at rest, the resistance of the field circuit is a minimum as the plunger is in its lowermost position producing the maximum pressure on the carbon plates. The pressure may be increased by the use of a spring, if desired.

The shunt coil 9 is normally short-circuited by a resilient short-circuiting reed 10, but is connected in circuit when said reed is attracted by the voltage responsive coil 11 connected in shunt across the external circuit and adapted to vibrate said reed for regulating purposes, as hereinafter described. An auxiliary coil 12 may be used to compensate for the varying reluctance of the air-gap and thereby increase the sensitiveness of the short-circuiting device. Suitable fuses 12' are also provided.

In order to close the external circuit of the generator to the battery and lamps when the generator voltage increases until it approximately equals the battery voltage, an automatic switch 13 is provided. The automatic switch has a voltage responsive shunt connected lifting coil 14 and a series connected releasing coil 15. When the automatic switch is open, a resistance 16 is short-circuited by a pivoted lever 17. When the automatic switch is closed, the resistance 16 is connected in series with the shunt coil 14 to prevent undue heating and consequent increase in resistance in said coil. The resistance also reduces the strength of said coil so that the automatic switch will fall open readily when the battery discharges through the releasing coil 15, as hereinafter described.

For the purpose of insuring proper initial excitation of the generator, the field coils 2 are included in a circuit around the battery, which includes the resistance 18, to prevent unnecessary waste of battery current. Any suitable form of resistance 19 may be provided for the lamp circuit to prevent an excessive voltage from being impressed on the lamps.

Assuming that this is approximately a 60 volt system, or one employing a 32 cell battery, the operation will be substantially as follows: The generator voltage builds up rapidly with increasing speed of armature rotation, aided by the initial excitation battery current. When the voltage is slightly in excess of 60 volts, the lifting coil 14 closes the automatic switch. The releasing coil 15 thereafter assists in holding the switch closed. The variable resistance 5 now regulates the generator field circuit to maintain substantially constant the current delivered by the generator. The shunt coil 9 is inert, being short circuited.

When the generator voltage rises to 80 volts, for example, due to the increasing counter-electro-motive force of the battery, the reed 10 vibrates rapidly, due to the increased energization of voltage responsive coil 11 and makes and breaks the short circuit around the shunt coil 9. This reed makes and breaks a practically non-inductive circuit and hence there is little sparking at the contacts. In consequence, the contacts do not deteriorate rapidly. The reed merely short circuits the coil, but not the resistance in series with the coil, hence there is no short circuit across the main circuit.

The operation of the relay may be described by considering the actions which tend to take place when it is in operation. When the voltage tends to rise about 80 volts, the reed is drawn down, thereby opening the short circuit and causing coil 9 to act cumulatively with series coil 8 and tending to increase the resistance 5, which in turn tends to decrease the field strength of the generator, and consequently the generator voltage. The tendency of the generator voltage to decrease, causes the voltage coil 11 to release the reed and allow it to spring back and again short circuit the coil 9, whereupon the resistance 5 is decreased, thereby tending to increase the field strength and the voltage of the generator. This cycle is repeated very rapidly, and the result is that the generator tends to hold down its voltage. A very slight variation in the voltage of the generator is sufficient to attract or release the reed.

When the shunt coil 9 becomes effective, the current delivered by the generator, and consequently the battery charging current diminish, producing a tapering of the battery charging current. During this period, the effect is a mixed current and voltage regulation, the generator voltage rising gradually from about 80 to 85 volts.

The tapering of the battery charging current is greater proportionately than the increase in counter electro-motive force of the battery. This may be due to a change in the character of the vibrations of the reed. At any rate, an additional increased effect or magnifying effect is secured.

In order to facilitate the attraction and release of the reed, the auxiliary coil 12 is provided, which may be connected in circuit in a variety of ways to perform this function. In Fig. 1 it is connected in a parallel branch with the shunt coil 9, and therefore is normally inert, being short-circuited by the reed 10 in the same manner that said shunt coil 9 is short-circuited. When the reed is attracted by the voltage winding 11, the short circuit is opened. Both the coils 9 and 12 are therefore energized simultaneously, and the latter coil opposes the voltage winding 11 to permit the reed 10 to spring back quickly. In Fig. 2 it is connected so as to assist the voltage coil 11 in drawing down the resilient reed, but is open circuited and rendered inert as soon as said reed is drawn down. In Fig. 3 it is connected in series with the shunt winding 9 and is energized when the reed is drawn down, to oppose the voltage winding 11 and permit a rapid return of the reed. In Fig. 4 the auxiliary coil assists the voltage coil in drawing down the reed, but is weakened by being connected in series with the shunt coil 9 when the reed is drawn down.

Fig. 5 shows the taper charge relay in the preferred commercial form. The core 20 of the relay is adjustable so as to vary the width of the air-gap. The stationary contact member 21 is also adjustable to regulate the vibrations of the reed 10. By means of these adjustments, the character of the vibrations may be varied to produce the desired results.

While the series coil 8 is illustrated as connected between the generator and the storage battery to regulate for constant total current, it may, of course, be otherwise connected where a different result is desired.

Inasmuch as the car on which the generator is mounted, may run in either direction, it is necessary to provide some form of pole changing device to insure proper polarity of the circuit leading from the generator whereby the generator will be charged in the proper direction. The pole changing device is not illustrated but may be of any approved type.

The various devices comprising the regulator, are all preferably mounted on a supporting panel located in a convenient part of the car. By virtue of the features of construction described herein, the jarring and vibration, to which the regulator is necessarily subjected, do not interfere with its successful operation.

I claim as my invention—

1. A taper charge regulator adapted for insertion in a system in which a variable speed generator operates to charge a storage battery, said regulator comprising a current responsive coil, a voltage responsive coil, a device for normally short circuting said voltage coil, a second voltage responsive coil for rapidly vibrating said short circuiting device upon predetermined voltage rise to increase the mean value of the magnetizing effect of said first voltage coil as the voltage continues to rise and a regulating resistance controlled by said first voltage coil and said current coil.

2. A system including a variable speed generator, a storage battery and a taper charge device comprising a shunt coil effective upon substantial rise in battery counter-electro-motive force to reduce the charging current by varying a resistance in the field circuit of said generator, said device also comprising a current responsive coil having a continuing cumulative action with said shunt coil, and means for increasing the effectiveness of said shunt coil at a greater rate than the increase in said counter-electromotive force and consequently decreasing said battery charging current in corresponding ratio.

3. A regulator comprising a magnetizing winding acting through certain instrumentalities to maintain constant the current output of a generator, a second winding having a continuing cumulative effect with said first winding and with said instrumentalities and responsive when energized to voltage variations in the system, and controlling means acting upon said second winding for magnifying the magnetizing effect thereof, whereby upon sufficient increase in voltage the magnetizing effect of said first winding is annulled.

4. A regulator comprising a variable resistance, electromagnetic means for varying said resistance to maintain substantially constant the effective number of ampere turns of said means, the latter including a current coil and a voltage coil, said voltage coil being normally inert whereby said variable resistance tends to maintain constant current, and a device effective upon predetermined rise in voltage for rendering effective said voltage coil in greater ratio than said rise in voltage whereby the effectiveness of said current coil is rapidly diminished until the voltage regulation predominates.

5. A taper charge regulator comprising a variable resistance consisting of contacting carbon plates, a plunger and bell crank lever for varying the pressure on said plates, two solenoids controlling the action of said plunger, and a taper charge relay for rendering effective one of said solenoids when the battery approaches a fully charged condition, said taper charge relay including a vibrating short circuiting device and voltage responsive means for controlling the character of the vibrations.

6. A taper charge regulator for a car lighting system, comprising a variable resistance consisting of contacting carbon plates, a plunger and bell crank lever for varying the pressure on said plates, two coils controlling the action of said plunger, and a taper charge relay for rendering effective one of said coils upon still further rise in voltage, said taper charge relay comprising a resilient short circuiting device adapted to vibrate, and a voltage responsive winding for vibrating said resilient device and for controlling the character of said vibrations.

7. A taper charge regulating device for a car lighting system, comprising a variable resistance consisting of contacting carbon plates, a plunger and bell crank lever for varying the pressure on said plates, two solenoids controlling the action of said plunger, and a taper charge relay for rendering effective one of said solenoids when the battery approaches a fully charged condition to gradually reduce the charging current to zero, whereby said variable resistance provides current regulation during the normal charging of the battery, mixed regulation during the taper charge and voltage regulation after the battery has become fully charged.

8. A taper charge regulator comprising a variable resistance for a generator field circuit, a series coil in the external circuit of said generator for operating said variable resistance to maintain substantially constant the generator current, a shunt coil responsive to voltage variations in the system and adapted to modify the operation of said variable resistance, a shunt circuit around said voltage responsive coil and means for modifying the resistance of said shunt circuit in response to voltage variations in the system to control the operation of said voltage responsive coil, said means and consequently said voltage coil being inert until the battery approaches a fully charged condition.

9. A taper charge regulator comprising a variable resistance for a generator field circuit, a series coil in the external circuit of said generator for operating said variable resistance to maintain substantially constant the generator output, a shunt coil responsive to voltage variations in the system and adapted to modify the operation of said variable resistance, a shunt circuit around said voltage responsive coil and means including a rapidly vibrating make and break device for modifying the resistance of said shunt circuit in response to voltage variations in the system to control the operation of said voltage responsive coil, said means and consequently said voltage coil being inert until the battery approaches a fully charged condition.

10. A taper charge regulator comprising a variable resistance for a generator field circuit, a series coil in the external circuit of said generator for operating said variable resistance to maintain substantially constant the generator output, a shunt coil responsive to voltage variations in the system and adapted to modify the operation of said variable resistance, a shunt circuit around said voltage responsive coil and means including a resilient circuit closing device and a voltage responsive winding for vibrating said device for modifying the resistance of said shunt circuit in response to voltage variations in the system to control the operation of said voltage responsive coil, said means, and consequently said voltage coil, being inert until the battery approaches a fully charged condition.

11. A taper charge regulator comprising a variable resistance for a generator field circuit, a series coil in the external circuit of said generator for operating said variable resistance to maintain substantially constant the generator output, a shunt coil responsive to voltage variations in the system and adapted to modify the operation of said variable resistance, a shunt circuit around said voltage responsive coil and means including a vibratile reed and voltage responsive means for vibrating the same for modifying the resistance of said shunt circuit in response to voltage variations in the system to control the operation of said voltage responsive coil, said means and consequently said voltage coil being inert until the battery approaches a fully charged condition.

12. A taper charge regulator comprising a variable resistance for a generator field circuit, a series coil in the external circuit of said generator for operating said variable resistance to maintain substantially constant the generator output, a shunt coil responsive to voltage variations in the system and adapted to modify the operation of said variable resistance, a shunt circuit around said voltage responsive coil and means for modifying the resistance of said shunt circuit in response to voltage variations in the system to control the operation of said voltage responsive coil, said means including a resilient short circuiting reed and a second voltage coil for vibrating said reed, the character of the vibrations corresponding to said voltage variations, said second coil being operative only above normal battery voltage.

13. A taper charge regulator comprising a variable resistance for a generator field circuit, a series coil in the external circuit of said generator for operating said variable resistance to maintain substantially constant the generator output, a shunt coil responsive to voltage variations in the system and adapted to modify the operation of said variable resistance, a shunt circuit around said voltage responsive coil and means for modifying the resistance of said shunt circuit in response to voltage variations in the system to control the operation of said voltage responsive coil, said means including a vibrating make and break device and an auxiliary coil for increasing the rate of vibration.

14. A taper charge regulator comprising a variable resistance, a series coil for operating said variable resistance to regulate for constant current, two shunt coils in parallel branches connected in a shunt circuit, a short circuiting device for simultaneously short circuiting both of said coils, one of said coils being adapted to modify the action of said series coil and the other of said coils being adapted to quicken the action of said short circuiting device.

15. A regulator for a car lighting system, comprising a series of contacting resistance plates adapted for connection in a generator field circuit, a series coil for varying said resistance and adapted to be connected in the external circuit of said generator, a voltage responsive coil adapted to modify the action of said series coil on said variable resistance but normally short circuited, a movable member normally short circuiting said voltage responsive coil and a second voltage responsive coil connected across the circuit and adapted upon substantial rise in the counter-electromotive force of the battery to vibrate said member and thereby introduce into circuit said voltage responsive coil for successive periods corresponding to the increasing voltage of the system whereby said variable resistance is increased to gradually reduce the charging current.

16. A taper charge regulator comprising a series of contacting resistance plates, a bell crank lever for varying the pressure on said series, a plunger for operating said bell crank lever, a series connected solenoid and a shunt connected solenoid for controlling the operation of said plunger, said shunt solenoid being normally short circuited by a resilient contact member, and a voltage responsive coil for vibrating said resilient contact member to render effective said shunt solenoid for gradually increasing intervals of time whereby, upon sudden rise in battery voltage when the same approaches a fully charged condition, said variable resistance is increased by said shunt solenoid to gradually reduce the charging current to the battery.

17. In car lighting apparatus, in combination, a shunt wound generator, a storage battery connected to be charged thereby, a resistance device connected with the field circuit of said generator, means comprising a coil serially connected between said generator and said battery adapted upon the current therein increasing to so affect said resistance as to weaken the generator field and normally to maintain said current substantially constant, a voltage coil positioned and adapted upon being energized to have a continuing cumulative effect with said current coil in affecting said variable resistance to weaken said generator field, a circuit in parallel or shunt relation to said voltage coil, and a relay controlled in accordance with the voltage of said battery and adapted to break said shunt circuit and to thereupon cause an effective current to flow in said voltage coil.

18. In car lighting apparatus, in combination, a shunt wound generator, a storage battery connected to be charged thereby, a variable resistance medium comprising a plurality of contacting members adapted to vary their aggregate resistance with the pressure thereon, said resistance medium being connected with the field circuit of said generator, a member through which pressure is exerted upon said medium, a pivoted bell-crank lever, one arm of which is connected with said member, magnetic actuating means connected with the other arm of said lever, means comprising a coil serially connected between said generator and said battery adapted upon the current therein increasing to attract said actuating means and so vary the pressure upon said resistance as to weaken the generator field, and normally to maintain said current substantially constant, said resistance being normally free from other effective electrical influence, a voltage coil coacting with said actuating means and adapted upon being energized to have a continuing cumulative effect with said current coil in varying the pressure upon said resistance to weaken the generator field, and voltage controlled means adapted to direct an effective flow of current through said voltage coil.

19. In car lighting apparatus, in combination, a shunt wound generator, a storage battery connected to be charged thereby, a variable resistance medium comprising a plurality of contacting members adapted to vary their aggregate resistance with pressure thereon, said resistance medium being connected in the field circuit of said generator, a resistance varying device coacting with said medium and tending to compress the same, said device comprising a pivoted bell-crank lever, one arm of which is provided with means coacting with said medium and the other arm of which is provided with actuating means, means comprising a coil serially connected between said generator and said battery adapted upon the current therein increasing to so coact with said actuating means as to decrease the pressure upon said resistance and normally to maintain said current substantially constant, said resistance being normally free from other effective electrical influence, a voltage coil positioned and adapted upon being energized to have a continuing cumulative effect with said current coil in decreasing the pressure upon said resistance, and a relay directly responsive to the voltage across said battery adapted to control a circuit whereby an effective current is directed through said voltage coil.

20. In car lighting apparatus, in combination, a generator having a shunt field winding, a storage battery connected to be charged thereby, a resistance medium operatively connected with the field circuit of said generator, means comprising a coil serially connected between said generator and said battery adapted upon the current therein tending to increase, to so affect said resistance as to weaken the field of said generator and normally to maintain said current substantially constant, said resistance being normally free from other effective electrical influence, a normally ineffective voltage coil adapted upon becoming effective to have a continuing cumulative action with said serially converted coil to control said generator current by acting on the resistance of the generator field circuit, and means directly responsive to the voltage across said battery adapted upon the voltage of said battery attaining a certain value to render said voltage coil effective in controlling said generator current.

21. In car lighting apparatus, in combination, a generator having a shunt field winding, a storage battery connected to be charged thereby, a resistance medium operatively connected with the field circuit of said generator and comprising a plurality of contacting members adapted to vary their aggregate resistance with the pressure thereon, means comprising a coil serially connected between said generator and said battery adapted upon the current therein tending to increase to so vary the pressure upon said resistance as to weaken the generator field and normally to maintain said current substantially constant, said resistance being normally free from other effective electrical influence, a normally ineffective voltage coil positioned and adapted upon being energized to have a continuing cumulative effect with said current coil in affecting said variable resistance, and a relay directly responsive to the voltage across said battery adapted to control a circuit whereby an effective current is directed through said voltage coil.

22. In car lighting apparatus, in combination, a generator having a shunt field winding, a storage battery connected to be charged thereby, a resistance medium operatively connected with the field circuit of said generator, means comprising a coil serially connected between said generator and said battery adapted upon the current therein tending to increase to so affect said resistance as to weaken the generator field and maintain the generator current substantially constant, said resistance being normally free from other effective electrical influence, a voltage coil adapted upon being rendered effective to have a continuing cumulative action with said first coil in varying said resistance and means directly responsive to the voltage across said battery adapted to direct an effective current through said voltage coil.

23. In car lighting apparatus, in combination, a generator having a shunt field winding, a storage battery connected to be charged thereby, a resistance medium operatively connected with the field circuit of said generator, said medium comprising a plurality of contacting members adapted to vary their aggregate resistance with pressure thereon, means comprising a coil serially connected between said generator and said battery adapted upon the current therein tending to increase to so effect said resistance as to weaken the generator field and maintain the generator current substantially constant, said resistance being normally free from other effective electrical influence, a normally ineffective voltage coil adapted upon being rendered effective to have a continuing cumulative action with said first coil in controlling the pressure upon said variable resistance and a relay directly responsive to the voltage across said battery adapted to divert an effective current through said voltage coil.

In witness whereof I have hereunto subscribed my name in the presence of two witnesses.

WILLIAM L. BLISS.

Witnesses:
  Geo. B. Jones,
  A. H. Ackermann.